April 14, 1953　　　A. H. BEEBE, JR　　　2,635,020
BEARING

Filed Aug. 1, 1950

INVENTOR.
Austin H. Beebe, Jr.
BY
Harness, Dickey & Pierce
ATTORNEYS.

Patented Apr. 14, 1953

2,635,020

UNITED STATES PATENT OFFICE 2,635,020

BEARING

Austin H. Beebe, Jr., Ann Arbor, Mich., assignor to Federal-Mogul Corporation, Detroit, Mich., a corporation of Michigan Application August 1, 1950, Serial No. 177,127

6 Claims. (Cl. 308—237)

This invention relates generally to bearings and more particularly to bearings having improved fatigue resistance and which are essentially stable when operated in an atmosphere or bath of hot lubricating oil. Bearings of this type are widely used, typical examples being the bearings between the connecting rods and the crankshaft of internal-combustion engines.

Heretofore, it has been conventional practice to make bearings of this type with a backing of hard metal, a surface layer or overlay of bearing material which has high fatigue strength and is essentially noncorrosive in hot lubricating oil, and a layer intermediate the backing and the overlay of metal having high heat-conducting characteristics and a medium modulus of elasticity. All of these metallic layers are suitably bonded together over their entire surfaces. Steel is universally used for the backing. A suitable lead base alloy having five per cent or more of tin usually is used for the overlay. Copper, silver, or alloys thereof conventionally are used as the intermediate layer; and, of these, copper-lead alloys generally are preferred.

Apparently, the tin in the overlay is largely responsible for the resistance of the bearing to corrosion and some difficulty has been experienced with the tin diffusing from the overlay into the intermediate layer. Diffusion of the tin is particularly pronounced if the intermediate layer is the preferred copper-lead alloy. Loss of tin from the overlay progressively reduces the resistance of the bearings to corrosion and thus considerably shortens the useful life of the bearings. Also, it is generally recognized that the diffused tin particles form undesirable metallic compounds of copper-tin on the surface of the intermediate layer.

These phenomena have been recognized by the industry, and means has been suggested for preventing diffusion of the tin. For example, Luetkemeyer et al. suggest, in Patent No. 2,459,172, issued January 18, 1949, that a barrier layer of nickel, cobalt, silver, or iron be interposed between the overlay and the intermediate layer. Apparently these barrier metals in some manner retard diffusion of tin from the overlay into the copper-lead intermediate layer.

While it is true that the four metals heretofore used for the barrier layer at least retard diffusion of tin from the overlay, not one of these metals is entirely satisfactory both from a commercial and a functional point of view. Each of these metals has certain recognized disadvantages. For example, silver and cobalt are too expensive to be commercially practicable. In addition and perhaps more important, silver and cobalt are considerably less effective than nickel and iron in preventing diffusion of tin from the overlay. In general it can be said that while silver and cobalt may be operative to retard diffusion of tin, they do not render the overlay sufficiently stable to satisfy commercial requirements. Nickel improves stability of the overlay; however, in practice it is difficult to electroplate satisfactorily onto the copper-lead intermediate layer which often is quite porous. Further, nickel makes a relatively poor bond with the intermediate layer, it is harder than desirable for its intended use, and it has a relatively low heat conductivity. Iron is perhaps the best of the four metals mentioned for promoting stability of the overlay, but it has all the disadvantages noted in connection with nickel.

From the foregoing it is apparent that the art has recognized and is seeking a solution to the problem set forth above but that proposed solutions to the problem have not been entirely satisfactory.

I have now discovered a metallic media that is preeminently satisfactory as a barrier material from a commercial point of view and that is markedly superior functionally to any of silver, nickel, cobalt, or iron heretofore used for this purpose. Specifically, I have discovered that brass, when used as a barrier between the overlay and the intermediate layer, establishes a good bond and promotes stability of the overlay. At the same time, disadvantages inherent in the several metals previously suggested for this purpose are avoided. Brass is an alloy of copper and zinc, both of which elements are available in large quantities. It is easily electroplated to a desired thickness and forms an excellent bond between the porous copper-lead intermediate layer and the lead-tin overlay. It is not objectionably hard, and its heat conductivity is adequate for the purpose of this invention. Further, the copper portion of the brass barrier layer apparently does not form undesirable metallic compounds with the tin in the overlay layer. Thus, the suitability of brass as a barrier layer is entirely unexpected in view of the generally known fact that, when the lead-tin overlay is applied directly to the copper-lead intermediate layer, tin particles diffuse from the overlay and form undesirable compounds with the copper of the copper-lead intermediate layer. This problem is recognized and dealt with at some length in the Luetkemeyer et al. patent supra. It is not known why the undesirable copper-tin compounds are not formed when brass is used as the barrier layer, but it would appear that the presence of zinc in the barrier layer has some effect on the two metals which prevents formation of the undesirable compounds.

The accompanying drawing shows a semicircular bearing illustrating the novel features of my invention.

Figure 1:
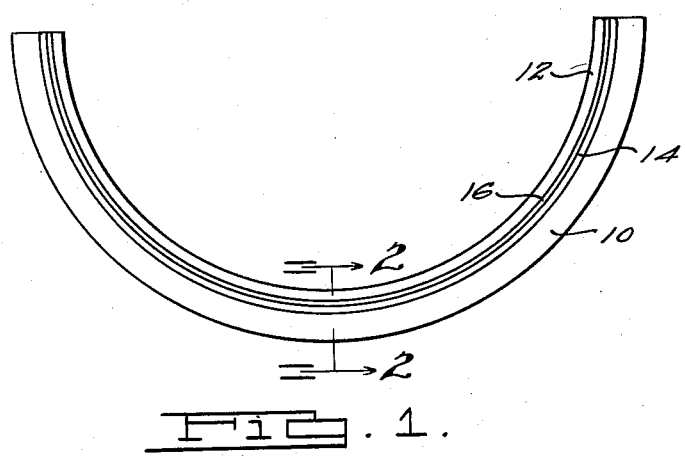
Fig. 1 is a top plan view of the bearing.
Figure 2:
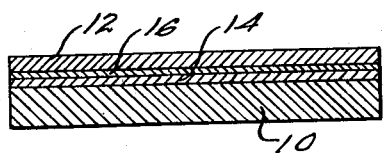
Fig. 2 is an enlarged, transverse sectional view taken on the line 2—2 of Fig. 1.

With particular reference to the drawing, the numeral 10 designates the conventional steel or other hard metal backing of the bearing. In addition, the bearing has the usual lead-tin overlay 12 and the copper lead intermediate layer 14 which is bonded to the backing 10 between the latter and the overlay. According to the present invention, a brass barrier layer 16 is interposed between and bonded over its entire surface to the overlay 12 on the one side and the intermediate layer 14 on the other.

The following test is typical of a number of tests which were made comparing brass as a barrier material with a large number of metals including the four metals recommended by Luetkemeyer et al. Except for the barrier, all of bearings used in the tests were identical having steel backing layers, copper-lead intermediate layers, and lead-in overlays combined and correlated as shown in the drawing. The bearings were tested in a conventional deflected shaft-type bearing testing machine, and they were subjected to the same load for approximately the same length of time. A chemical analysis of the lead-in overlay of each bearing was made before and after testing to determine loss of tin from the overlay. For purpose of comparison, a bearing was tested which was identical to the ones described above except that it had no barrier layer at all. The following results were observed:

| Composition of Barrier Between the Intermediate Layer and the Overlay | Percent of Tin Diffused from the Overlay |
| --- | --- |
| Brass (zinc 20%, copper 80%) | 10 |
| Nickel | 23 |
| No intermediate layer | 35 |

In practice I have found that the brass barrier layer 16 is effective in various thicknesses. A barrier layer approximately 0.0001 inch is satisfactory, but there is nothing to indicate that this is critical. Apparently the thickness of the intermediate layer 14 is determined only by the exigencies of the particular situation. The barrier layer 16 may be applied by well-known electroplating or equivalent processes.

The brass barrier layer 16 preferably comprises from 15% to 35% zinc and from 65%–85% copper. These ranges are not necessarily critical, but they do represent optimum proportions. As the amount of zinc is reduced below 15% there is a progressive decrease in the "barrier" effect, or, conversely, a progressive increase in the diffusion of tin from the overlay. As the amount of zinc is increased above 35%, the adhesion effect or bond between the brass layer and the intermediate layer becomes progressively poorer. Thus, as the proportion of zinc is varied in either direction beyond the range given, there is a gradual loss of the benefit of this invention. However, it will be appreciated that some benefits can be obtained even though zinc is present in proportions outside the preferred range.

While the present invention is not particularly concerned, except as noted above, with the nature or physical dimensions of the bearing apart from the barrier layer, bearings having the following characteristics have been found to be satisfactory. It is to be understood, however, that these characteristics are given merely by way of illustration and not by way of limitation.

1. Steel backing layer, 0.04%–0.20% carbon, depending upon the application and method of manufacture of the bearing
2. Copper-lead intermediate layer, 21%–27% lead; 73%–79% copper
3. Brass barrier layer, 65%–85% copper; 15%–35% zinc
4. Lead-tin overlay, 8%–12% tin; 88%–92% lead The following is a specification of a typical bearing made and tested during development of this invention.

1. Steel backing layer, 0.1% carbon, 0.050 inch thick
2. Copper-lead intermediate layer, 24% lead, 76% copper, 0.015 inch thick
3. Brass barrier layer, 75% copper, 25% zinc, 0.0001 inch thick
4. Lead-tin overlay, 10% tin, 90% lead, 0.001 inch thick When applying the brass barrier layer 16 by electroplating methods, the copper-lead intermediate layer 14 is first cleaned in the usual manner and the brass is then electroplated on the cleaned copper-lead surface using approximately the following bath conditions:

| | |
| --- | --- |
| Copper cyanide | 50 grams per liter |
| Zinc cyanide | 75 grams per liter |
| Sodium cyanide | 175 grams per liter |
| Sodium carbonate | 30 grams per liter |
| Sodium potassium tartrate | 45 grams per liter |
| Ammonium hydroxide (conc.) | 5 ml. per liter |
| Temperature | 35°–50° C. |
| Current density | 20–50 amp. per sq. ft. |
| Time for 0.0001 inch | 2–4 minutes |

After the brass layer 16 has been deposited on the copper-lead intermediate layer 14 the bearing is rinsed, acid dipped, rinsed again and the lead-tin overlay 12 then plated on the barrier layer 16 in the conventional way.

Having thus described the invention, I claim:

1. A composite bearing comprising a steel backing layer, an intermediate layer of copper-lead alloy on said backing layer, a surface layer of a tin containing bearing alloy metal, and a barrier layer of brass between said intermediate layer and said surface layer, all of said layers being uniformly bonded to each other over their entire surfaces.

2. A composite bearing comprising a steel backing layer, an intermediate layer of copper-lead alloy, a surface layer of bearing metal alloy containing at least 5% tin, and a barrier layer of brass between said intermediate layer and said surface layer, all of said layers being uniformly bonded to each other over their entire surfaces.

3. A composite bearing comprising a steel backing layer, an intermediate layer of copper-lead alloy on said backing layer, a surface layer of a tin containing bearing alloy metal, and a barrier layer of brass approximately .0001″ thick between said intermediate layer and said surface layer, all of said layers being uniformly bonded to each other over their entire surfaces.

4. A composite bearing comprising a steel backing layer, an intermediate layer of copper-lead alloy, a surface layer of bearing metal alloy containing at least 5% tin, and a barrier layer of brass containing at least 15% and not more than 35% zinc between said intermediate layer and said surface layer, all of said layers being uniformly bonded to each other over their entire surfaces.

5. A composite bearing comprising a hard metal backing layer, an intermediate layer of copper-lead alloy on said backing layer, a surface layer of tin containing bearing-alloy metal, and a barrier layer of brass between said intermediate layer and said surface layer, all of said layers being uniformly bonded to each other over their entire surfaces.

6. A composite bearing comprising a hard metal backing layer, an intermediate layer of high conductivity metal on said backing layer, a surface layer of tin containing bearing-alloy metal, and a barrier layer of brass between said intermediate layer and said surface layer covering the entire surface of said intermediate layer exposed to said surface layer, said brass barrier layer effectively preventing contact between said surface layer and said intermediate layer and inhibiting any tendency for tin to migrate from said surface layer into said intermediate layer.

AUSTIN H. BEEBE, Jr.

References Cited in the file of this patent

UNITED STATES PATENTS

| Number | Name | Date |
|---|---|---|
| 1,303,408 | Starker | May 13, 1919 |
| 2,459,172 | Luetkemeyer et al. | Jan. 18, 1949 |